(12) United States Patent
Yamaguchi et al.

(10) Patent No.: US 8,437,574 B2
(45) Date of Paint: May 7, 2013

(54) IMAGE PROCESSING APPARATUS, IMAGE FORMING APPARATUS, IMAGE PROCESSING METHOD AND COMPUTER READABLE MEDIUM STORING PROGRAM

(75) Inventors: Yuya Yamaguchi, Saitama (JP); Shinichi Takahashi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 700 days.

(21) Appl. No.: 12/613,825

(22) Filed: Nov. 6, 2009

(65) Prior Publication Data
US 2010/0254626 A1 Oct. 7, 2010

(30) Foreign Application Priority Data

Apr. 1, 2009 (JP) ................................ 2009-089360

(51) Int. Cl.
*G06K 9/36* (2006.01)
*G06K 15/00* (2006.01)

(52) U.S. Cl.
USPC ........................... 382/284; 358/1.18; 715/241

(58) Field of Classification Search .................. 382/276, 382/284; 358/1.15, 1.18, 1.9; 715/234–254
See application file for complete search history.

(56) References Cited

U.S. PATENT DOCUMENTS

| | | | |
|---|---|---|---|
| 5,857,064 A * | 1/1999 | deSilva ......................... | 358/1.13 |
| 6,348,975 B1 | 2/2002 | Tsunekawa et al. | |
| 6,441,919 B1 * | 8/2002 | Parker et al. ................. | 358/1.18 |
| 6,662,270 B1 * | 12/2003 | Sans et al. ..................... | 711/118 |
| 7,327,487 B2 | 2/2008 | Prosi | |
| 7,757,169 B2 * | 7/2010 | Aizikowitz et al. ........... | 715/255 |
| 8,233,164 B2 * | 7/2012 | Matsuda ....................... | 358/1.13 |
| 2004/0096255 A1 * | 5/2004 | Jauert .............................. | 400/76 |
| 2006/0187488 A1 * | 8/2006 | Sakamoto .................... | 358/1.18 |
| 2007/0081190 A1 | 4/2007 | Prosi | |
| 2007/0268522 A1 * | 11/2007 | Miyamoto .................... | 358/1.18 |
| 2008/0144108 A1 * | 6/2008 | Kahana et al. ............... | 358/1.18 |
| 2009/0002762 A1 * | 1/2009 | Sakamoto et al. ........... | 358/1.16 |
| 2009/0147288 A1 * | 6/2009 | Matsuda ........................ | 358/1.9 |
| 2010/0079798 A1 * | 4/2010 | Iguchi .......................... | 358/1.15 |

FOREIGN PATENT DOCUMENTS

| | | |
|---|---|---|
| EP | 1 306 798 A2 | 5/2003 |
| JP | 11-305975 | 11/1999 |
| JP | 2004-021886 | 1/2004 |
| JP | 2006-237825 A | 9/2006 |
| JP | 2006-264224 A | 10/2006 |

OTHER PUBLICATIONS

European Search Report dated Oct. 8, 2012 from the European Patent Office in a counterpart European Application 09178372.0.
JP Office Action issued on Jan. 30, 2013 from the Japanese Patent Office in Japanese Application No. 2009-089360.

* cited by examiner

*Primary Examiner* — Aaron W Carter
(74) *Attorney, Agent, or Firm* — Sughrue Mion, PLLC

(57) ABSTRACT

An image processing apparatus includes: a receiving unit for receiving an additional image data to be overlaid on an output image, a modification unit for modifying the additional image data received by the receiving unit so as to shorten the processing time of converting the additional image into a binary image compared with before it modified, a storage unit for storing the additional image data modified by the modification unit, a converting unit for converting the modified additional image data stored in the storage unit into a binary image data when instruction of overlaying the additional image on the output image has been done, and a drawing unit for drawing the binarized additional image data converted by the converting unit on the output image.

14 Claims, 21 Drawing Sheets

FIG. 1A
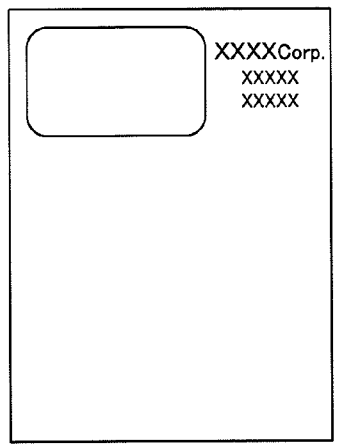
OVERLAY IMAGE 1
+
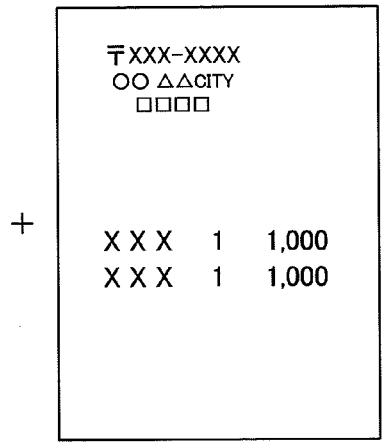
PAGE IMAGE
+
OVERLAY IMAGE 2
OVERLAY IMAGE 3
OVERLAY IMAGE 4
FIG. 1B
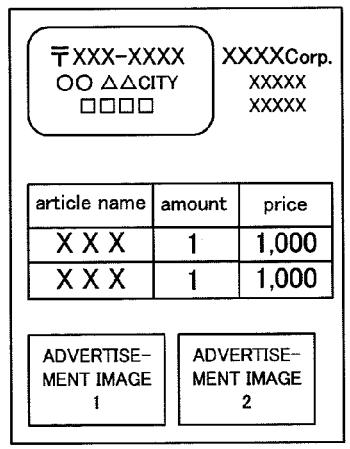
OUTPUT RESULT

FIG. 5

OVERLAY CONTROL TABLE

| OVERLAY ID | BIT-MAPPED IMAGE DATA STORAGE LOCATION ADDRESS | OVERLAY IMAGE DATA STORAGE LOCATION ADDRESS |
|---|---|---|
| 00001 | ***** | ***** |
| 00002 | ***** | ***** |
| 00003 | ***** | ***** |
| 00004 | ***** | ***** |
| 00005 | ***** | ***** |
| ... | ... | ... |

OUTPUT RESULT

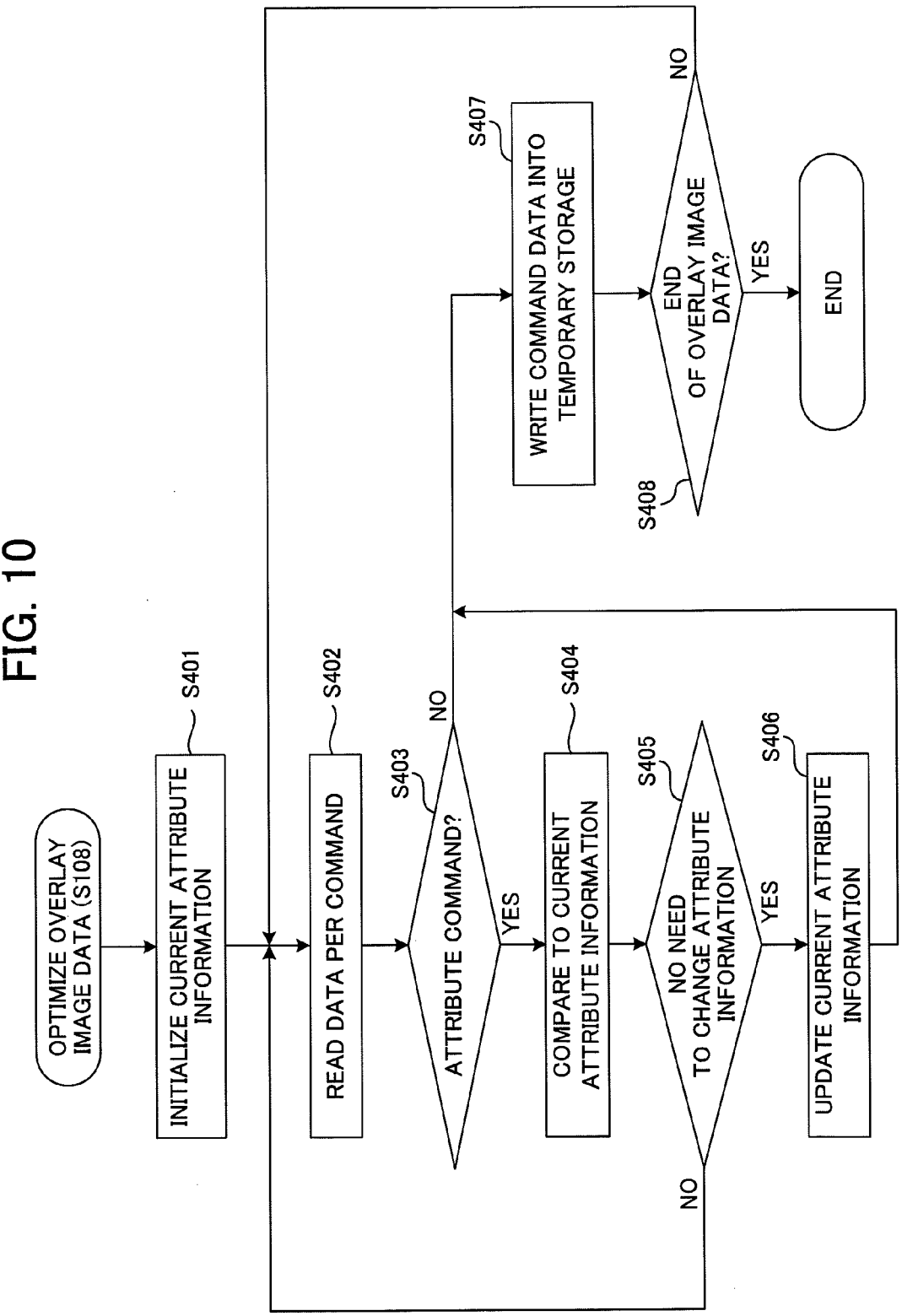

OUTPUT RESULT

ABCDEFG

HIJKLMN

OVERLAY IMAGE DATA

```
TEXT DRAWING (ABCDEFG)
LINE FEED
LINE FEED
X RELATIVE MOVEMENT
TEXT DRAWING (HIJKLMN)
```

⇩ OPTIMIZATION

```
TEXT DRAWING (ABCDEFG)
ABSOLUTE-XY DESIGNATION
TEXT DRAWING (HIJKLMN)
```

OUTPUT RESULT

LINE

OVERLAY IMAGE DATA

```
TEXT DRAWING (ABC)
LINE WIDTH :1
LINE STYLE :SOLID
LINE DRAWING (3 INCH)
ABSOLUTE-XY
IMAGE PLACEMENT (IMG1)
ABSOLUTE-XY
IMAGE PLACEMENT (IMG2)
```

⇩ OPTIMIZATION

```
LINE WIDTH :1
LINE STYLE :SOLID
LINE DRAWING (1 INCH)
ABSOLUTE-XY
IMAGE PLACEMENT (IMG1)
ABSOLUTE-XY
IMAGE PLACEMENT (IMG2)
```

FIG. 17

OVERLAY CONTROL TABLE

| OVERLAY ID | BIT-MAPPED IMAGE DATA STORAGE LOCATION ADDRESS | OVERLAY IMAGE DATA STORAGE LOCATION ADDRESS | OPTIMIZATION FLAG |
|---|---|---|---|
| 00001 | ***** | ***** | 1 |
| 00002 | ***** | ***** | 1 |
| 00003 | ***** | ***** | 0 |
| 00004 | ***** | ***** | 0 |
| 00005 | ... | ***** | 0 |
| | | ... | ... |

FIG. 20

OVERLAY CONTROL TABLE

| OVERLAY ID | BIT-MAPPED IMAGE DATA STORAGE LOCATION ADDRESS | OVERLAY IMAGE DATA STORAGE LOCATION ADDRESS | OPTIMIZATION FLAG | NUMBER OF TIMES OF RERENDERING |
|---|---|---|---|---|
| 00001 | ***** | ***** | 1 | 1 |
| 00002 | ***** | ***** | 1 | 1 |
| 00003 | ***** | ***** | 0 | 0 |
| 00004 | ***** | ***** | 0 | 0 |
| 00005 | ... | ... | 0 | 0 |

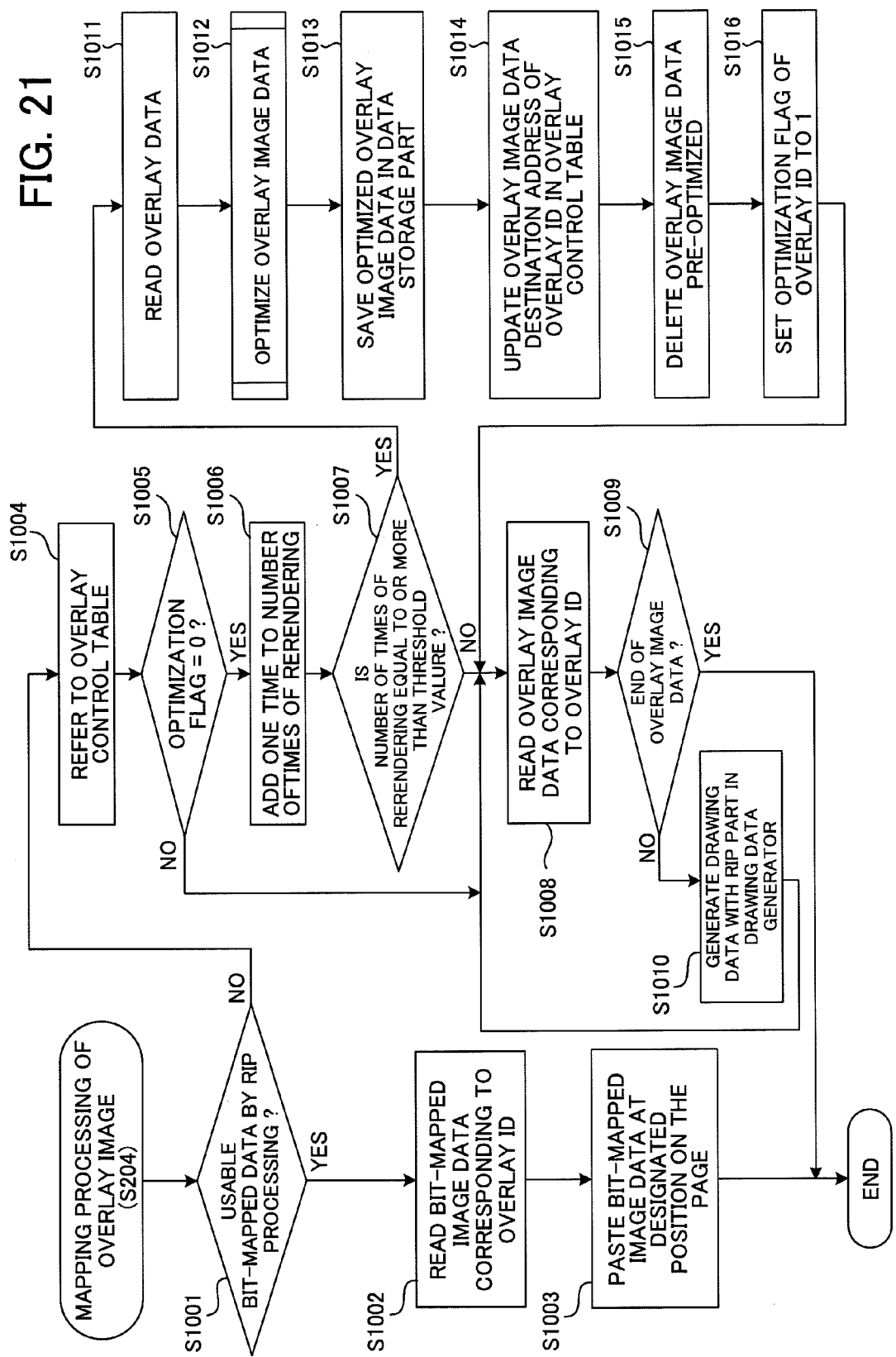

IMAGE PROCESSING APPARATUS, IMAGE FORMING APPARATUS, IMAGE PROCESSING METHOD AND COMPUTER READABLE MEDIUM STORING PROGRAM

CROSS-REFERENCE TO RELATED APPLICATIONS

This application is based on and claims priority under 35 USC 119 from Japanese Patent Application No. 2009-089360 filed Apr. 1, 2009.

BACKGROUND

Technical Field

The present invention relates to an image processing apparatus, an image forming apparatus, an image processing method, and a computer readable medium storing a program.

SUMMARY

According to an aspect of the invention, there is provided an information processing apparatus including: a receiving unit that receives an additional image data to be overlaid on an output image, a modification unit that modifies the additional image data received by the receiving unit so as to shorten the processing time of converting the additional image into a binary image compared with before it modified, a storage unit that stores the additional image data modified by the modification unit, a converting unit that converts the modified additional image data stored in the storage unit into a binary image data when instruction of overlaying the additional image on the output image has been done and a drawing unit that draws the binarized additional image data converted by the converting unit on the output image.

BRIEF DESCRIPTION OF THE DRAWINGS

An exemplary embodiment of the present invention will be described in detail based on the following figures, wherein:

FIGS. 1A and 1B are diagrams illustrating an output result generated with a stored overlay images and a page image based on variable page data;

FIG. 5 is a diagram showing content stored in an overlay control table;

FIG. 10 is a flowchart illustrating a processing sequence for executing the first specific example of the optimization;

FIG. 17 is a diagram showing an exemplary overlay control table used in an image processing apparatus 12 according to a second exemplary embodiment of the present invention;

FIG. 20 is a diagram showing an exemplary overlay control table used in an image processing apparatus 12 according to a third exemplary embodiment of the present invention; and FIG. 21 is a flowchart illustrating the mapping processing of the overlay image in the image processing apparatus according to the third exemplary embodiment of the present invention.

DETAILED DESCRIPTION

Figure 2:
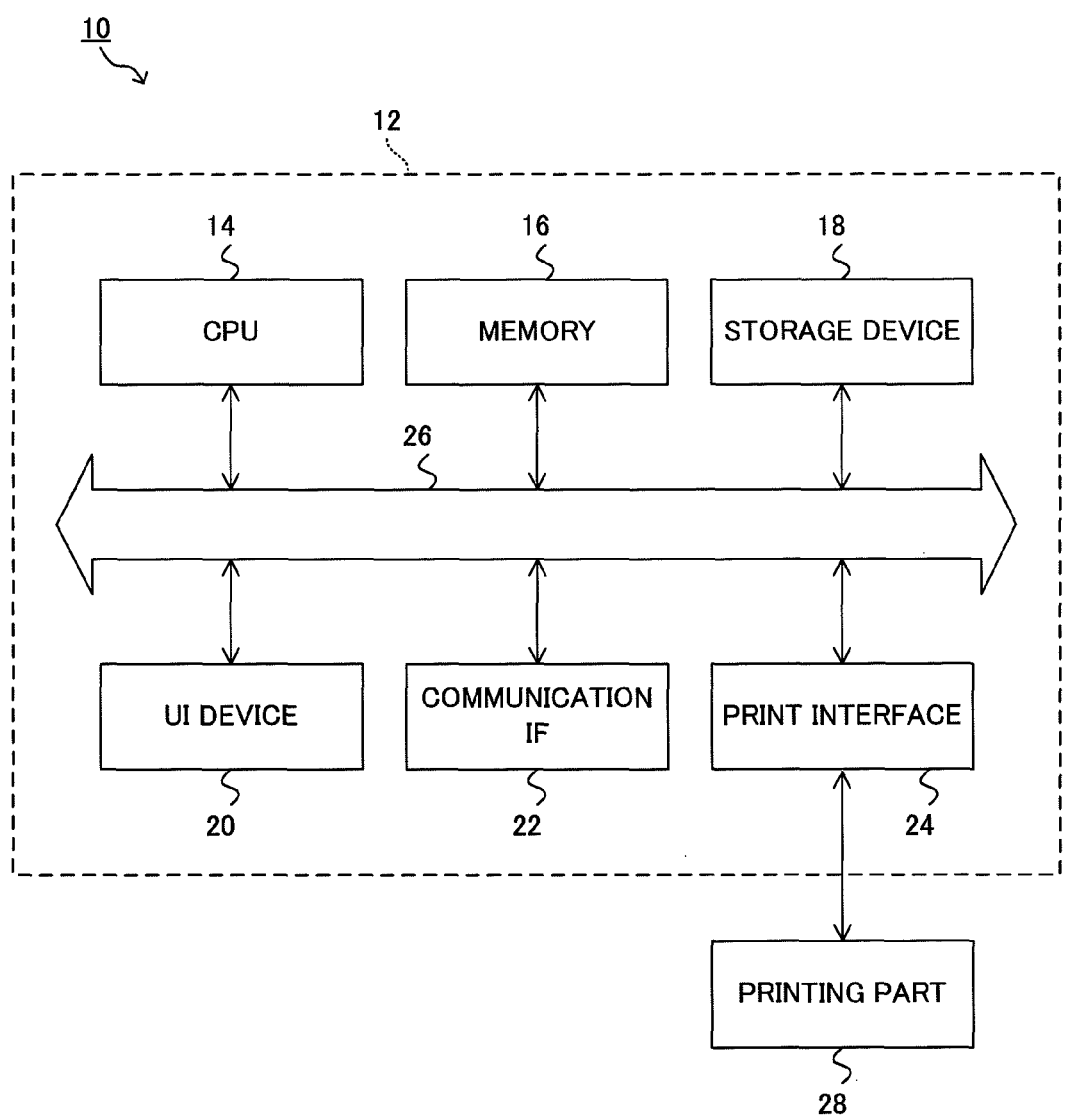
FIG. 2 is a diagram showing hardware configuration of an image forming apparatus 10 including an image processing apparatus 12 according to a first exemplary embodiment of the present invention.

Generally, an image processing apparatus generates an output image by drawing sequentially an overlay image and a variable page data image. The image processing apparatus sometimes uses plural overlay images on a page, or uses an overlay image corresponding to a variable page data image after drawing the variable page data image. Thus, it is likely that there are overlaps between the variable page data image and the overlay image, or between the overlay images.

FIGS. 1A and 1B are diagrams illustrating an output result generated with stored overlay images and a page image based on variable page data.

FIG. 1A illustrates overlay images 1 to 4 and a page image for generating an output image of one page. As shown in FIG. 1A, an overlay image 1 is a background image with hatching, and an overlay image 2 is a ruled line image for a table. Further, overlay images 3 and 4 are advertisement images. The page image is an image drawn based on variable page data.

For generating the output image, at first, the overlay image 1 is overlaid on the output image, and next the page image is drawn and overlaid on the output image. After the page image is drawn and overlaid on the output image, the overlay images 2 to 4 are overlaid thereon subsequently in random order.

FIG. 1B shows the output result of the generated output image. This output result illustrates one image generated by drawing the overlay images 2 to 4 on the overlay image 1 and the page image.

Next, an exemplary embodiment of the present invention will be described in detail with reference to accompanying drawings.

First Exemplary Embodiment

First, an image processing apparatus according to a first exemplary embodiment of the present invention will be described.

FIG. 2 is a diagram showing hardware configuration of an image forming apparatus 10, including an image processing apparatus 12, according to the first exemplary embodiment of the present invention.

As shown in FIG. 2, the image forming apparatus 10 has the image processing apparatus 12 and a printing part 28 for printing an image generated by the image processing apparatus 12. The image processing apparatus 12 has a CPU 14, a memory 16, a storage device 18 such as a hard disk drive, a user interface (UI) device 20, a communication interface (IF) 22, and a print IF 24. These components are connected via a bus 26 with each other.

The UI device 20 includes a display device such as a liquid crystal display, and a light emitting diode (LED), and an input device such as a keyboard and a mouse. The UI device 20 may be a touch panel. The communication IF 22 communicates data with an external computer via not shown network. The print IF 24 outputs image data to the printing part 28.

The printing part 28 has printing units corresponding to each color of e.g. yellow (Y), magenta (M), cyan (C), and black (K). The printing unit may be achieved by xerography or ink-jet printing.

Figure 3:
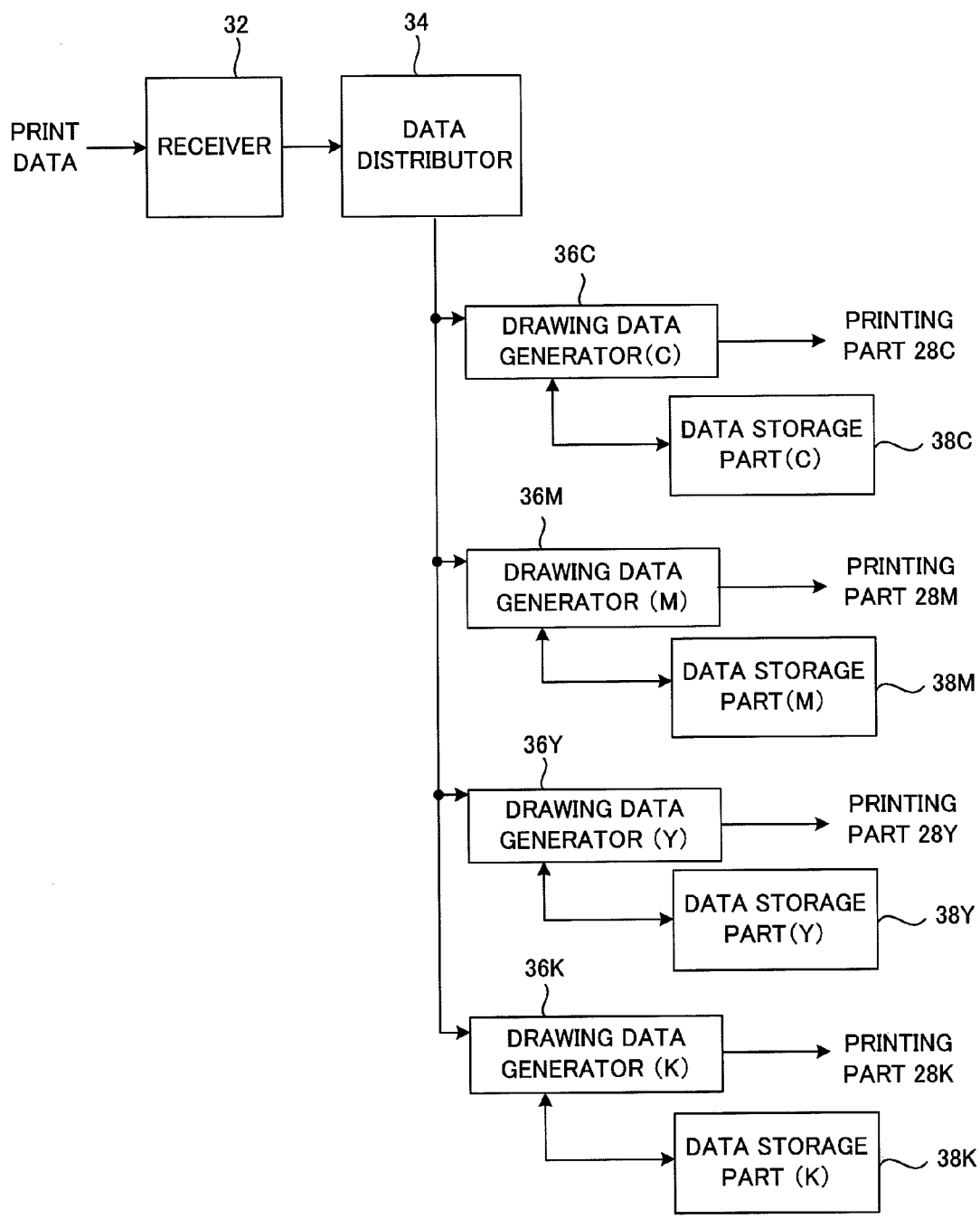
FIG. 3 is a block diagram showing a functional configuration of an image processing program 30 for performing an image processing method with the image processing apparatus 12 according to the first exemplary embodiment of the present invention to operate on CPU 14.

FIG. 3 is a block diagram showing a functional configuration of an image processing program 30 for achieving an image processing method by the image processing apparatus 12 according to the exemplary embodiment of the present invention and operates on the CPU 14.

As shown in FIG. 3, the image processing program 30 has a receiver 32, a data distributor 34, drawing data generators 36C, 36M, 36Y, and 36K, and data storage parts 38C, 38M, 38Y, and 38K. Note that all or a part of function in the image processing program 30 may be achieved by a hardware disposed in the image processing apparatus 12.

The receiver 32 receives print data from an external host computer not shown via the communication IF 22 in the image processing program 30. The print data including character, graphic, image, and the like data is written with prescribed page description language (PDL). The receiver 32 outputs the received print data to the data distributor 34. Note that the receiver 32 may receive the print data read via a recording medium such as CD and DVD.

The print data includes at least one or both of resource data and page data. The resource data is data for drawing a reusable image such as an overlay image. The page data is a variable data for drawing an image including numerical number, character, and symbol, or the like on every page. Note that the overlay image is an additional image which is equally used page-by-page on a document involving plural pages for generating the output image by overlaid on each page image in the document.

The data distributor 34 distributes the print data to the drawing data generators 36C, 36M, 36Y, and 36K.

The drawing data generators 36C, 36M, 36Y, and 36K respectively generate binary image data by rendering each color binary image (bit-mapped image) based on each print data distributed. For instance, the drawing data generator 36C generates the binary image data for cyan. The drawing data generators 36C, 36M, 36Y, and 36K respectively output the generated binary image data to the printing part 28C, 28M, 28Y, and 28K page-by-page.

Further, the drawing data generators 36C, 36M, 36Y, and 36K respectively save the binary image (the overlay image) data generated in accordance with the resource data into the data storage parts 38C, 38M, 38Y, and 38K. When the page data is received, the drawing data generators 36C, 36M, 36Y, and 36K respectively generate the binary image data by rendering each color binary image accordance with the saved overlay image data and the received image data.

Note that the drawing data generators 36C, 36M, 36Y, and 36K will be described in detail later. Further, note that a component consisting of plural kinds such as e.g. the drawing data generators 36C, 36M, 36Y, and 36K is sometimes abbreviated to e.g. a drawing data generator 36 simply.

The data storage parts 38C, 38M, 38Y, and 38K respectively store each color binary image data generated by the drawing data generators 36C, 36M, 36Y, and 36K. The data storage part 38 is achieved by at least one or both of the memory 16 and the storage device 18.

Figure 4:
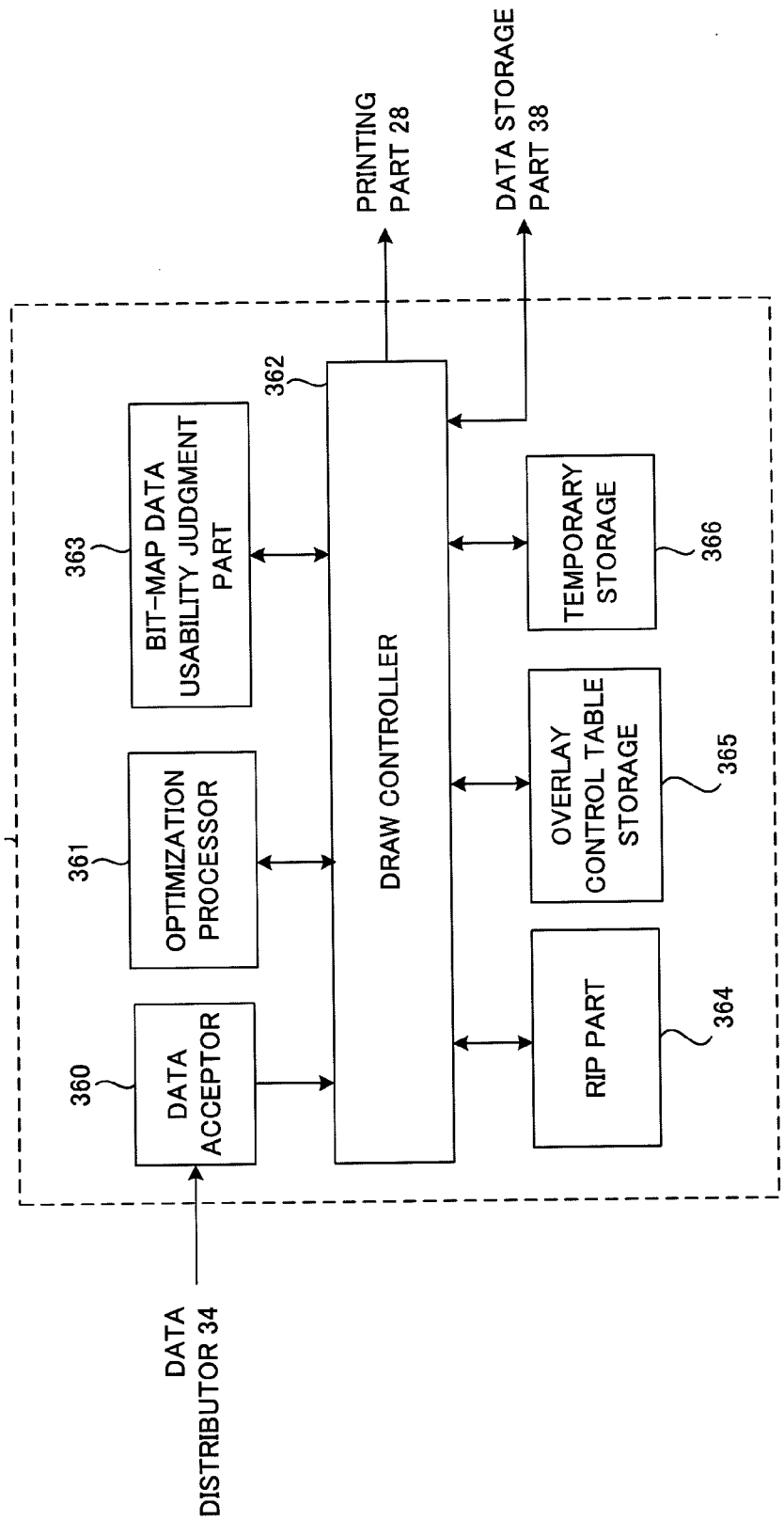
FIG. 4 is a block diagram showing a detail configuration of drawing data generators 36C, 36M, 36Y, and 36K.

FIG. 4 is a block diagram showing a detail configuration of the drawing data generators 36C, 36M, 36Y, and 36K.

As shown in FIG. 4, the drawing data generators 36 has a data acceptor 360, an optimization processor 361, a draw controller 362, a bit-mapped data usability judgment part 363, a raster image processing (RIP) part 364, an overlay control table storage 365, and a temporary storage 366.

The data acceptor 360 receives the print data from the data distributor 34, and outputs the print data to the draw controller 362 in the drawing data generator 36.

The overlay control table storage 365 stores an overlay control table which is a table for controlling the overlay image data and the bit-mapped image data converted from the overlay image data by the RIP part 364. The overlay control table storage 365 is achieved by at least one or both of the memory 16 and the storage device 18.

FIG. 5 illustrates an example of the overlay control table stored in the overlay control table storage 365.

As shown in FIG. 5, the overlay control table has data including a overlay image identifier (overlay ID) identifying an overlay image, a overlay image data storage location address of the overlay ID, and a bit-mapped image (binary image) data storage location address in accordance with the overlay image data.

The temporary storage 366 stores a binary image data in a state of drawing an image with the draw controller 362 described later. For instance, the temporary storage 366 stores an overlay image data, an output image data, or the like which is being generated. Note that the binary image data in the temporary storage 366 is deleted at prescribed timing.

The optimization processor 361 executes optimization of the overlay image data by modifying the overlay image data received by the data acceptor 360 so as to shorten the processing time of converting into bit-mapped image data compared with before it modified. Note that the optimization means a processing for modifying the overlay image data so as to shorten the processing time of converting the overlay image data into the bit-mapped image data not in the shortest time but in a shorter time before.

The bit-mapped data usability judgment part 363 determines whether or not the bit-mapped image data stored in the data storage part 38 is usable when the print data has a mapping instruction for adding the overlay image to the output image.

Note that, in the bit-mapped data availability part 363 judges, the case of determination that the bit-mapped overlay image is not usable is thought that, for instance, the overlay image including raster operation (ROP) designation and the page image together overlap. Namely, in the above case of overlapping, it is necessary to operate between the overlay image and the page data image, and accordingly, the operation can not be executed with the each color bit-mapped data converted from the overlay image.

The RIP part 364 converts the overlay image data received at the data acceptor 360 into the bit-mapped data, and stores the bit-mapped data in the data storage part 38.

The overlay image data received by the data acceptor 360 is optimized by the optimization processor 361, and is stored in the data storage part 38. Thus, The data storage part 38 stores the overlay image data optimized by the optimization processor 361 and the bit-mapped data converted by the RIP part 364.

The RIP part 364 converts the optimized overlay image data stored in the data storage part 38 into bit-mapped data when the bit-mapped data usability judgment part 363 judges that the bit-mapped data is not usable.

The draw controller 362 controls other components in the drawing data generators 36, and draws an image in accordance with print data received at the data acceptor 360.

Further, the draw controller 362 registers the overlay ID set by every overlay image, the overlay image data storage location address, and the bit-mapped image (binary image) data storage location address by RIP part 364.

The draw controller 362 sequentially analyzes instructions in the print data to generate an output image. Accordingly, in the draw controller 362, when the print data includes the page data, the output image is generated based on the page data. Further, when the print data includes the mapping instruction of the overlay image, the output image is overlaid the overlay image thereon and each page of the output image data is output to the printing part 28.

Note that the draw controller 362 renders the bit-mapped image data stored in the data storage part 38 in the page image data when the determination that the bit-mapped image data is usable.

Also, when the judgment that the bit-mapped image data is not usable, the draw controller 362 converts the overlay image data before binarization in the data storage part 38 into the bit-mapped image data by the RIP part 364 to render the bit-mapped image data in the page image data.

Next, the operation of the image processing apparatus 12 according to the exemplary embodiment of the present invention will be described in detail with referring to Drawings.

Figure 6:
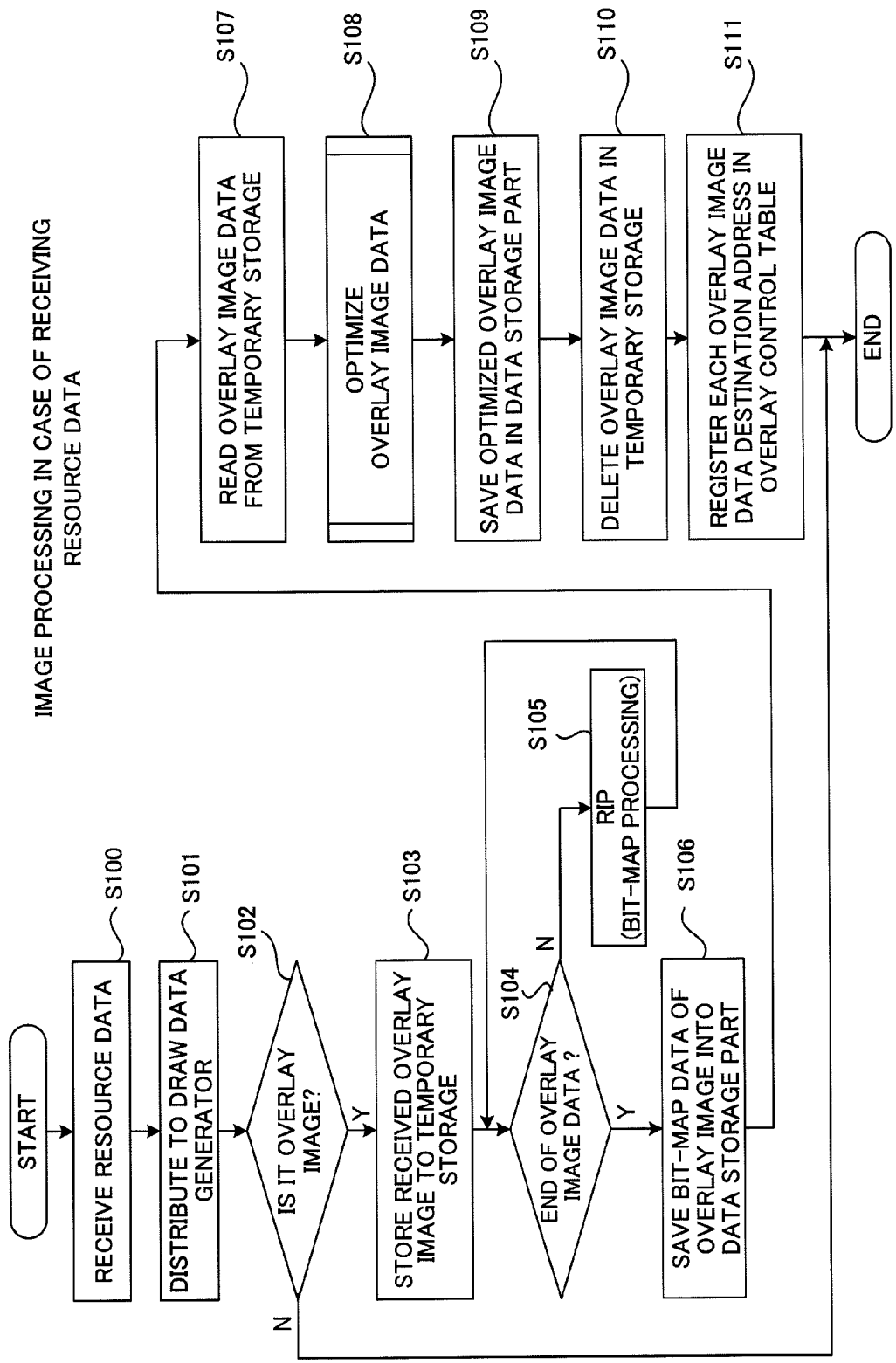
FIG. 6 is a flowchart showing an image processing executed in case that resource data is received in the image processing apparatus 12 according to the first exemplary embodiment of the present invention.

First, it will be described by a flowchart of FIG. 6 for an image processing in case that resource data is received in the image processing apparatus 12 according to the exemplary embodiment.

First, the receiver 32 in the image processing program 30 receives a resource data transmitted via communication IF 22 (step S100). Then, the data distributor 34 distributes the resource data to the drawing data generators 36C, 36M, 36Y, and 36K (step S101).

Next, the data acceptor 360 in the drawing data generator 36 receives the resource data, and the draw controller 362 analyzes the instruction in the resource data to judge whether or not the subject of a drawing image is an overlay image (step S102). If the subject of the drawing image is an overlay image, the draw controller 362 advances the next process, step S103. In contrast, if the subject of the drawing image is not the overlay image, the draw controller 362 terminates the process by a prescribed process.

If the judgment that the subject of the drawing image is the overlay image is performed in step S102, the draw controller 362 directs the temporary storage 366 to store the received overlay image (step S103).

Further, the draw controller 362 judges whether or not the instruction in the resource data indicates that the overlay image data is terminated (step S104). In step S104, if the instruction does not indicate that the overlay image data is not terminated, the draw controller 362 allows the RIP part 364 to execute raster image processing (RIP) for converting the overlay image data into the bit-mapped image data, and allows the data storage part 38 to save the bit-mapped image data (step S105). Specifically, the draw controller 362 executes the conversion of each color image based on the overlay image data.

Further, the draw controller 362 saves the converted bit-mapped data to the data storage part 38 when the instruction in step S104 is judged that the overlay image data is terminated (step S106).

Next, the draw controller 362 reads the overlay image data from the temporary storage 366 (step S107), and executes the optimization by the optimization processor 361 (step S108). The specific example of the optimization for the overlay image data will be described later.

Further, the draw controller 362 stores the optimized overlay image data by the optimization processor 361 in the data storage part 38 (step S109), and deletes the overlay image data stored in the temporary storage 366 (step S110).

Furthermore, the draw controller 362 registers the storage location addresses of the optimized overlay image data by the optimization processor 361 and the bit-mapped image data by the RIP part 364 into the overlay control table storage 365 (step S111).

Figure 7:
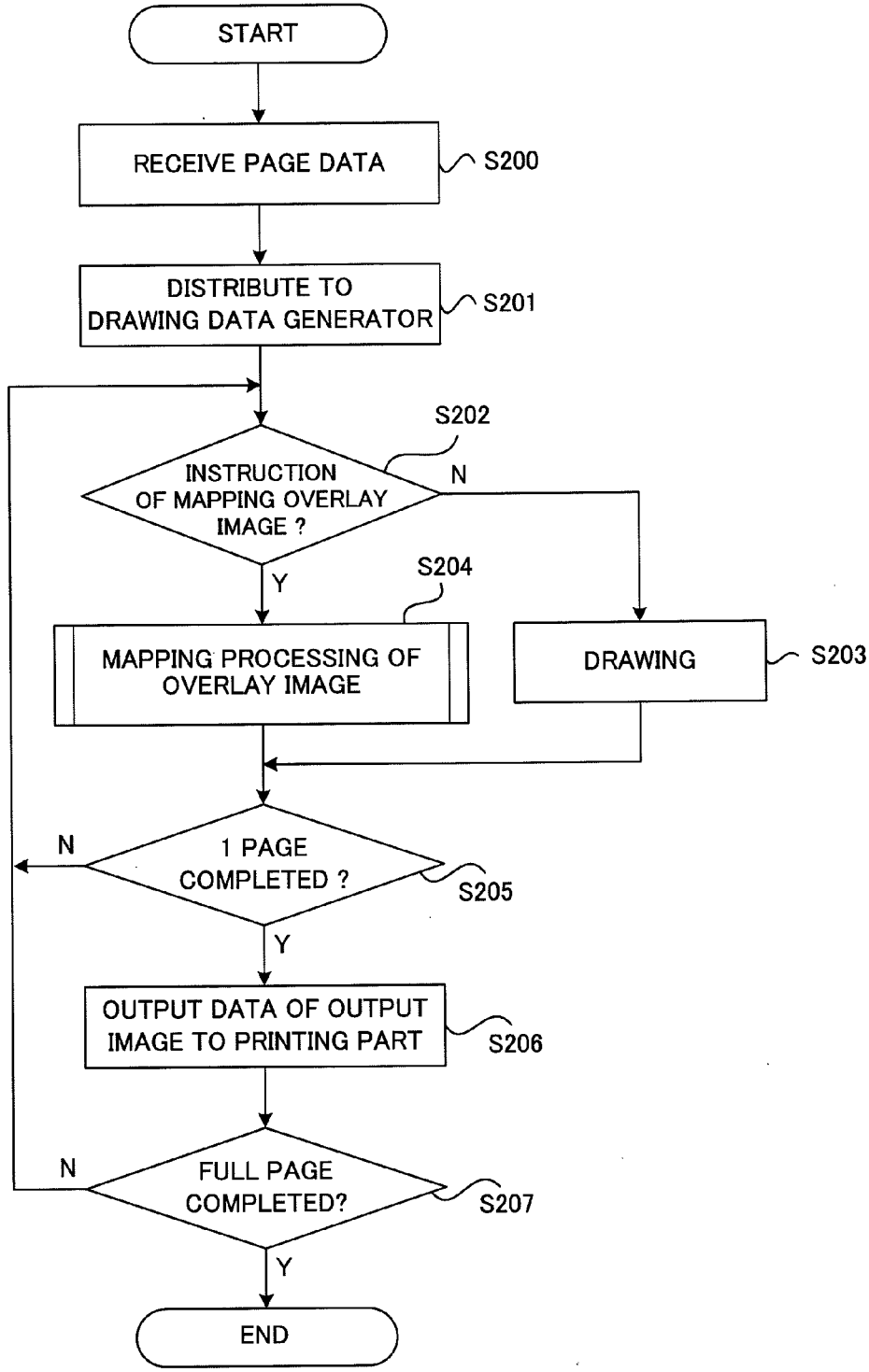
FIG. 7 is a flowchart showing an image processing executed in case that page data is received in the image processing apparatus 12 according to the first exemplary embodiment of the present invention.

Next, FIG. 7 shows a flowchart of an image processing executed in case that page data is received in the image processing apparatus 12 according to the exemplary embodiment of the present invention.

First, the receiver 32 in the image processing program 30 receives a page data transmitted via communication IF 22 (step S200). Then, the data distributor 34 distributes the page data to the drawing data generators 36C, 36M, 36Y, and 36K (step S201).

Next, the data acceptor 360 in the drawing data generator 36 receives the page data, and the draw controller 362 analyzes the instruction in the page data to judge whether or not the instruction is for mapping the overlay image (step S202). If the instruction is for mapping the overlay image ("Yes" in step S202), the draw controller 362 executes the overlay mapping processing to raster the output image (step S204). If the instruction is not for the overlay development ("No" in step S202), the draw controller 362 performs the RIP for the page data received merely to raster the output image (step S203).

Further, by analyzing the page data, the draw controller 362 judges whether or not the generation of the output image of one page had been completed (step S205). When the generation of the output image for one page has been completed, the process advances toward step 206 ("Yes" in step S205). Otherwise the image process advances toward step S202 ("No" in step S205).

Furthermore, the draw controller 362 outputs the output image data of a page to the printing part 28 in step S206. The printing parts 28C, 28M, 28Y, and 28K respectively print each color output image corresponding to each color component based on the output image data on a recording medium such as a sheet.

Finally, the draw controller 362 judges whether or not full-page output images having the page data has been generated (step S207). If the full-page output images have been generated, the draw controller 362 terminates the process ("Yes" in step S207). Otherwise the process ("No" in step S207) is returned to the process of step S202 for executing the overlay mapping processing of the next-page output image.

Figure 8:
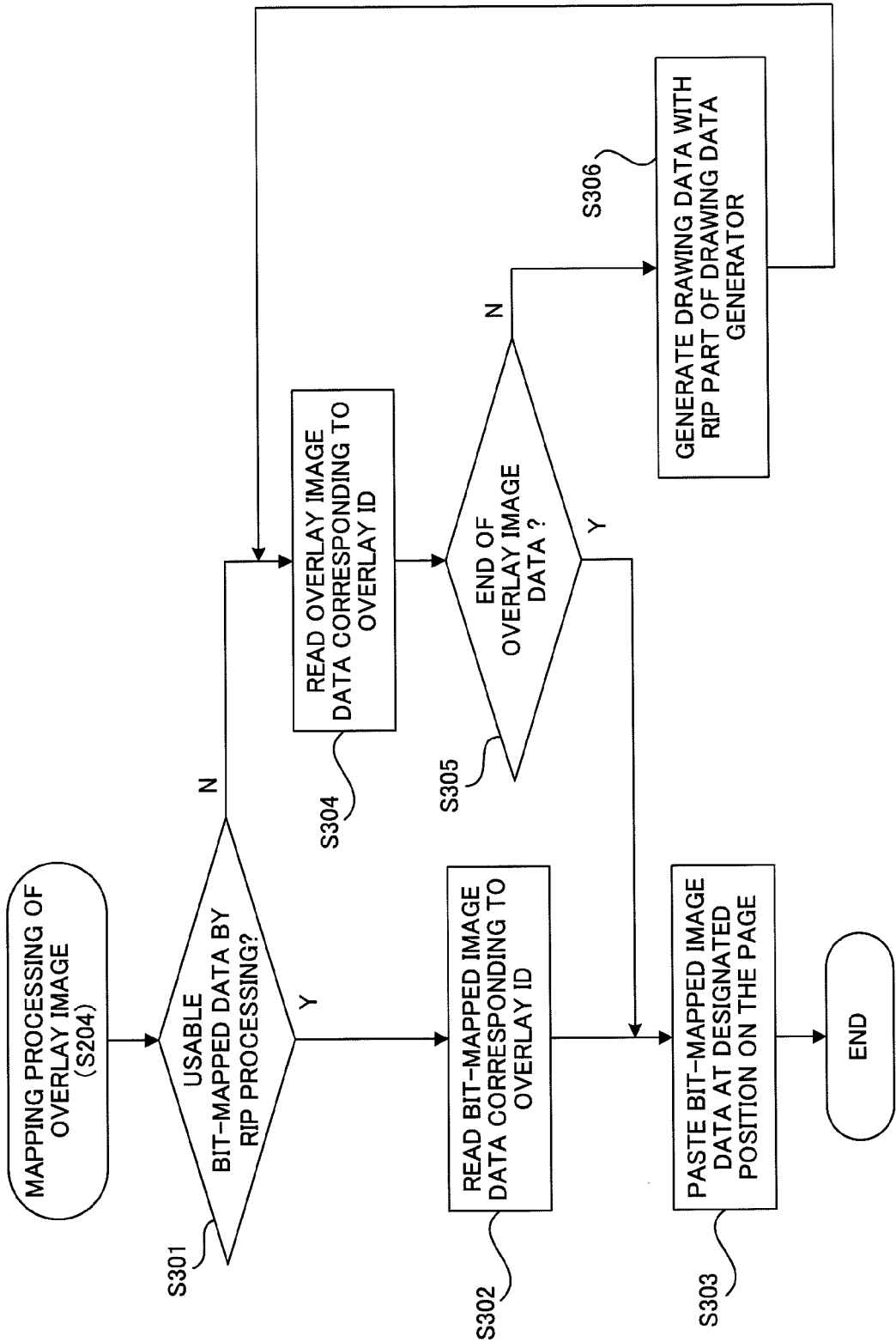
FIG. 8 is a flowchart illustrating a mapping processing of the overlay image in the flowchart of FIG. 7 (step S204)

Next, the mapping processing of the overlay image in FIG. 7 (step S204) will be described with referring to the flowchart of FIG. 8.

The bit-mapped data usability judgment part 363 judges whether or not the bit-mapped image data by RIP is usable when the draw controller 362 judges that the instruction in the page data is for the overlay mapping processing (step S301).

If the judgment is that the bit-mapped image data is usable, the draw controller 362 reads the bit-mapped image data corresponding to the designated overlay ID from the data storage part 38 (step S302) to paste the bit-mapped image data on the designated position of the page image (step S303).

In the judgment of step S301, if the bit-mapped image data is not usable, the draw controller 362 reads the overlay image data corresponding to the designated overlay ID from the data storage part 38 (step S304). Further, the draw controller 362 executes the processing for converting again (re-rendering) the overlay image data with the RIP part 364 in the case of the judgment that the overlay image data is not terminated (step S305).

Further, the draw controller 362 pastes the bit-mapped image data by re-rendering the overlay image data on the designated position of the page image (step S303).

The optimization of the overlay image data (step S108) in the flowchart of FIG. 6 will be described with specific examples below.

[First Specific Example of the Optimization]

Figure 9A:
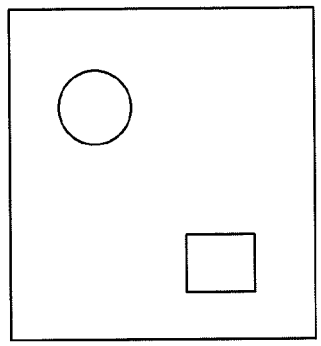
FIGS. 9A and 9B are diagrams illustrating a first specific example of an optimization.

First, a first specific example of the optimization will be described with referring to FIGS. 9A and 9B.

In the first specific example, the optimization of the overlay image data in the case of an output result shown in FIG. 9A will be described.

In the first specific example, the optimization processor 361 deletes a redundancy, which allows the printing result not to be modified even if deleted, in the commands of the overlay image data.

Specifically, the optimization processor 361 compares the current setting with the prior setting for confirming a difference at time of processing attribute commands in the overlay image data. If the current attribute command is identical to the prior attribute command, the current attribute command is deleted. For instance, when plural images such as a circle and a rectangle respectively having an identical line width and an identical line style are drawn on one page, it is capable of successively drawing by initially designating the line width and the line style in the case that the identical line width and style are set for every commands of the circle and the rectangle. The optimization processor 361 executes the optimization for overlay image data by deleting the above redundancies in the overlay image data commands.

Figure 9B:
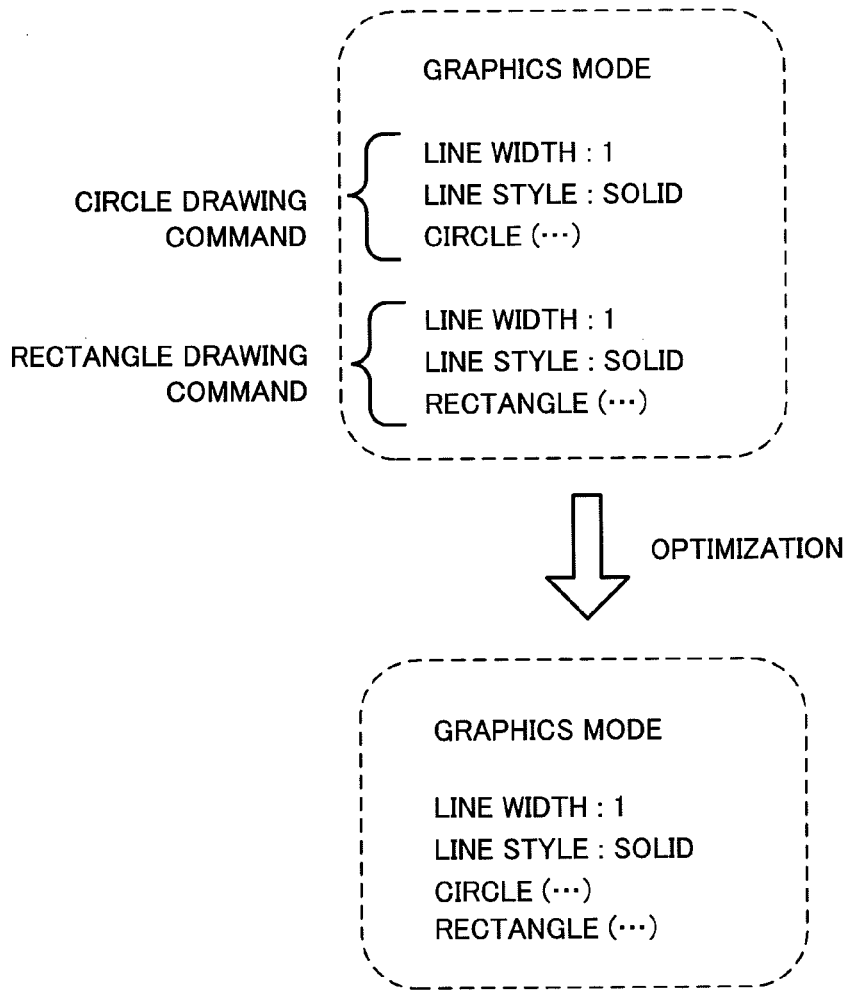

In an example shown in FIG. 9B, there are commands designating an identical line width and an identical line style in the commands for designating a cycle drawing and a rectangle drawing. Accordingly, the commands for designating a line width and a line style are deleted from the commands for the rectangle drawing by the optimization.

A specific process for executing the optimization will be described with referring to a flowchart of FIG. 10.

First, the optimization processor 361 initializes current attribute information for initially holding current value of the attribute information (step S401). Next, the optimization processor 361 reads the overlay image data with respect to each command (step S401), and confirms whether the command is an attribute command (step S402). Not the attribute command, the optimization processor 361 writes the command data on the temporary storage 366 (step S407). Further, not the end of the overlay image data, the optimization processor 361 advances the process for confirming the next command (step S408).

In step S403, if the command read in step S402 is the attribute command, the optimization processor 361 compares the attribute information value of the read command with the current attribute information value (step S404). If there is not a difference between both of the attribute information, the optimization processor 361 advances the process for confirming the next command without writing on the temporary storage 366 ("No" in step S405) because the read command can be omitted.

In step S405, if there is a difference between both of the attribute information, the optimization processor 361 updates the current attribute information with the attribute information of the read command (step S406), and writes the read command data on the temporary storage 366 (step S407). The series of steps are repeated until the overlay image data is terminated (step S408).

[Second Specific Example of the Optimization]

Figures 11A, 11B:
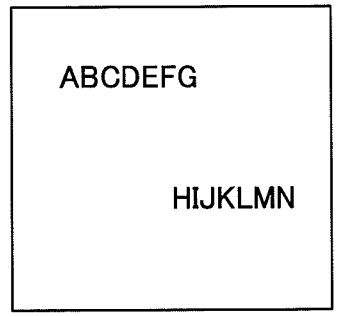
FIGS. 11A and 11B are diagrams illustrating a second specific example of the optimization.

Next, a second specific example of optimization processing will be described with referring to FIGS. 11A and 11B.

In the second specific example, the optimization of the overlay image data in the case of an output result shown in FIG. 11A will be described.

In the second specific example, the optimization processor 361 substitutes a redundancy, which allows the printing result not to be modified even if deleted, in the commands of the overlay image data. Namely, when plural commands in the overlay image data can be integrated, the optimization processor 361 executes the optimization by substituting the plural commands with the one command.

As specific examples, there are two methods: one is a method grouping substantive operations of coordinate transformation command to one (method 1), and another is a method substituting related attribute commands, which have been designated until then, with only an attribute command needed at next drawing (Method 2).

For the method 1, when the drawing processing is not executed between the coordinate transformation commands, the optimization processor 361 substitutes plural coordinate transformation commands designated until then with one command (including the mixture of the relative coordinate command and the absolute coordinate command) at next drawing. For instance, the optimization allows the coordinate transformation to be performed in one step compared to the original data needing plural steps by substituting the XY absolute coordinate and the XY relative coordinate with the XY absolute coordinate, or substituting the combination of the relative coordinate and a line break command with the XY absolute coordinate.

For the method 2, when there are plural attribute commands, the optimization processor 361 substitutes the related attribute commands designated until then with an attribute command finally needed at next drawing. For instance, if, at first, the color designation is executed from the default (black) to blue, and subsequently the drawing designation is executed, the optimization processor 361 deletes the default (black) to be only the blue color designation in the drawing data.

Figure 12:
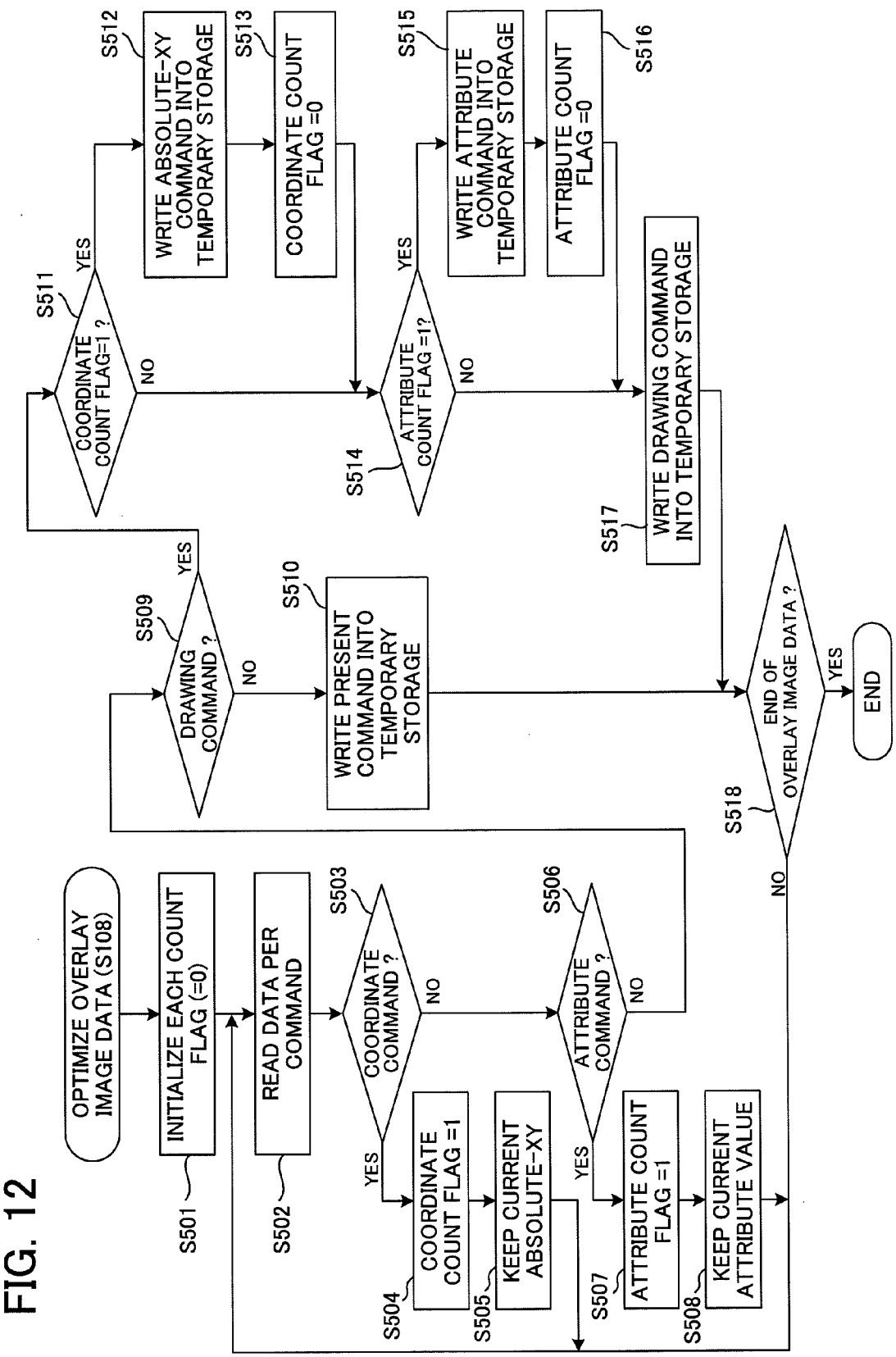
FIG. 12 is a flowchart illustrating a processing sequence for executing the second specific example of the optimization.

A specific process for executing the optimization will be described with referring to a flowchart of FIG. 12.

First, the optimization processor 361 initializes various count flags (step S501). Next, the optimization processor 361 reads the overlay image data with respect to each command (step S502) to confirm whether the read command is a command for coordinate transformation (step S503). If the read command is the coordinate command, the optimization processor 361 sets the coordinate count flag to 1 (step S504) and holds the XY absolute position corresponding to the current coordinate designation (step S505), and the next command processing is advanced.

If the read command is not the coordinate command, the optimization processor 361 confirms whether the read command is an attribute command (step S506). If the read command confirmed is the attribute command, the optimization processor 361 sets the attribute count flag to 1 (step S507) and holds the current attribute information (step S508), and next command processing is advanced.

When the read command is neither the coordinate command nor the attribute command (namely both judgments in steps 503 and S506 are indicated by "No"), the optimization processor 361 subsequently confirms whether the read command is a draw command (step S509). If the read command is the draw command and the coordinate count flag is 1 ("Yes" in step S511), the optimization processor 361 writes the command indicating the XY absolute coordinate on the temporary storage 366 (step S512). Thus, the optimization processor 361 sets the coordinate count flag to 0 (step S513).

Next, if the attribute count flag is set to 1 ("Yes" in step S514), the optimization processor 361 writes the read command having the attribute information on the temporary storage 366 (step S515), further sets the attribute count flag to 0 (step S516). Furthermore, the optimization processor 361 writes the designated draw command on the temporary storage 366 (step S517).

If the read command is not anyone of the coordinate command, the attribute command, and the draw command (All choices are "No" in steps S503, S506, and S509), the optimization processor 361 writes the read command on the temporary storage 366 directly (step S510). The optimization processor 361 repeats the series of the processing until the overlay image data is terminated (step S518).

[Third Specific Example of the Optimization]

Next, a third specific example of the optimization will be described with referring to FIGS. 13A and 13B.

In the third specific example, the optimization processor 361 sorts the commands of the overlay image data within the scope where the printing result is not modified thereby. Namely, the optimization processor 361 sorts the data within the scope which does not affect the rendering result in the optimization for the overlay image data.

When a data sequence, e.g. CHARACTER1-GRAPHIC1-CHARACTER2-IMAGE-CHARACTER3 . . . , renders, the attribute processing is performed in every draw processing of the character. Accordingly, the optimization of the third specific example allows the drawing processing to be performed speedily by grouping the CHARACTERs 1 to 3 together with one command or a series of the commands.

Also, the optimization may be performed by editing the commands, with not only sorting the data but also grouping data part of plural commands to one data part of the commands.

Note that the optimization of the third specific example is executed under the condition where there are not overlap data or is executed with keeping the order of overlap between commands. Accordingly, if there is overlap data, sorting of data is executed with the order of overlap between commands is kept.

Figure 13A:
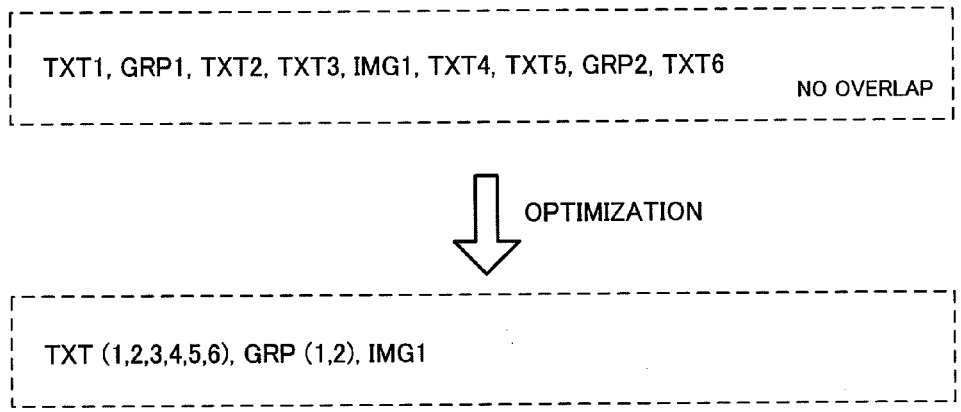
FIGS. 13A and 13B are diagrams illustrating a third specific example of the optimization.

For instance, FIG. 13A illustrates a specific optimization which groups plural commands TXT designating a text drawing and plural commands GRP designating a graphic drawing with each one command because of the case that the data sequence has no overlap data.

Figure 13B:
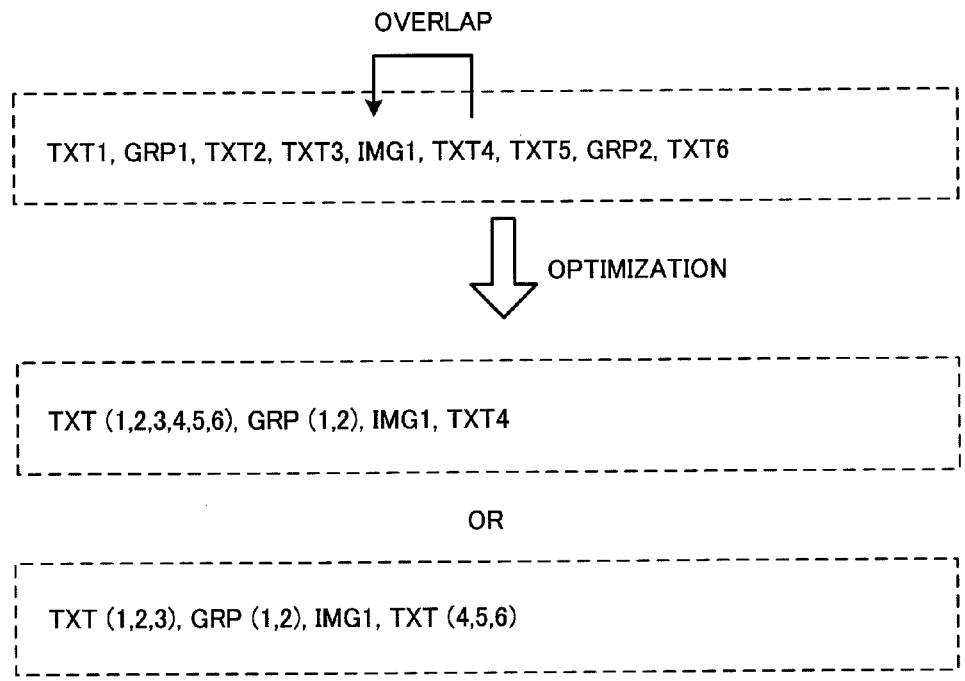

Also, FIG. 13B illustrates a specific optimization which groups plural commands within the scope which dose not change the order of commands IMG1 and TXT4 because of the case that commands IMG1 and TXT4 overlap each other in the data sequence.

Figure 14:
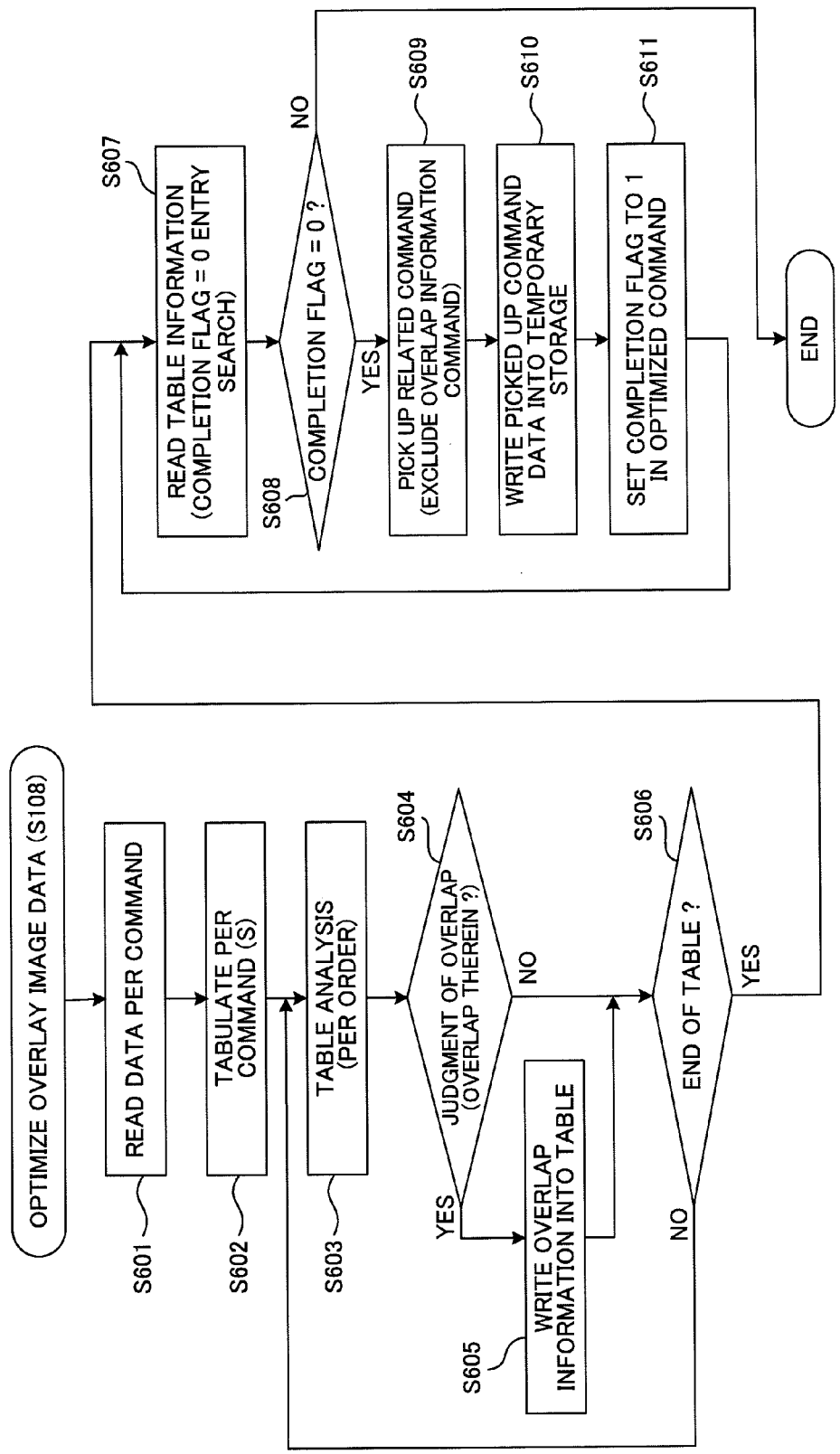
FIG. 14 is a flowchart illustrating a processing sequence for executing the third specific example of the optimization.

A specific process for executing the optimization will be described with referring to the flowchart of FIG. 14.

First, the optimization processor 361 reads the overlay image data with respect to each command (step S601) and tabulates with respect to each command or command group (step S602). The table is generated by entered in chronological order of command based on command type, offset value at starting, data size, drawing position, drawing area information, overlap information (Default value=0), and completion flag information (Default value=0). Note that the attribute information and the coordinate information at the time of starting reading the drawing commands are also registered in addition to the above entered information in the case where a PDL designates the coordinate and the attribute differently from the drawing commands. However, a PDL designating of the position and the attribute in the data part of the drawing commands does not need the registration.

Further, the optimization processor 361 analyzes the table completed (step S603). Furthermore, the optimization processor 361 judges whether there is an overlap area between entered contents based on the analyzed result (step S604), and writes the overlap information on the table when the overlap exists (step S605). Namely, the optimization processor 361 writes the overlap information for a combination of commands overlapping each other on the table. The judgment is executed until the table is terminated (step S606).

After the judgment for the overlap, the optimization processor 361 searches the entry of a completion flag=0 from the top of the table (step S607). When the entry of the completion flag=0 exists ("Yes" in step S608), the optimization processor 361 picks out an entry in the same kind of command as the command having the above searched entry from trailing commands (step S609). However, the command having the above searched entry is put aside when the read command is a side superscripting area designated by other commands, and the optimization processor 361 terminates the processing for picking out.

Next, the optimization processor 361 reads the command data picked out to write on the temporary storage 366 (step S610), and sets the completion flag of the completed command on the table to 1 (step S611).

The optimization processor 361 repeats the series of the processing until the entry of the completion flag=0 disappears, that is, the replacement of all commands have completed (step S611).

[Fourth Specific Example of the Optimization]

Figures 15A, 15B:
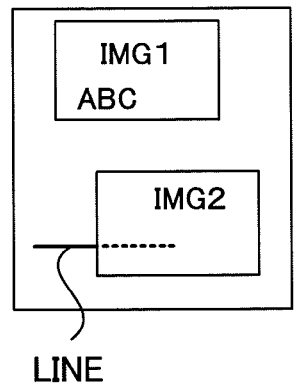
FIGS. 15A and 15B are diagrams illustrating a fourth specific example of the optimization.

Next, a fourth specific example of the optimization will be described with referring to FIGS. 15A and 15B.

In the fourth specific example, the optimization of the overlay image data in the case of an output result shown in FIG. 15A will be described.

In the fourth specific example, the optimization processor 361 executes the optimization of cutting off a deletion caused by superscription with the latter drawing data.

In the optimization of the fourth specific example, the optimization processor 361 holds drawing area information of each drawing command (group) on the other part, e.g. other table. Next, the optimization processor 361 judges whether the area corresponding to designated information by the next drawing command completely overwrites the area corresponding to the previous command. The judgment is executed for each of all previous commands (groups). If the command completely overwritten exists, the optimization is executed by deleting the command overwritten. The command deleted by the optimization includes a graphics command such as an image file. Also, a command partially overwritten may be modified command data thereof in some cases.

Specifically, the cases of a drawing command for a character and a graphic will be described below.

(a) The Case of the Character Drawing

First, the position information is calculated each command. Further, when an overlap between commands is found in the judgment of the next processing, the command analysis processing is executed again in each word thereof for deleting the data of each word completely overlapped on.

(b) The Case of the Graphic Drawing

In the case of the command for a line or a curve, when a partial overlap is found in the judgment, the command analysis processing is executed again for modifying the command overlapping by recalculating a start point or an end point in the line.

Note that, in the case of modifying the command deleted by partially overwritten, the start point of the overwritten need not to be strictly calculated, namely, the overwritten and deleted part may be a delimited portion when the modification is executed in the method easily calculating the command or in the condition capable of performing speedy the drawing processing. For instance, the case where the deleted part is delimited by e.g. multiples of eight is applicable.

Figure 16:
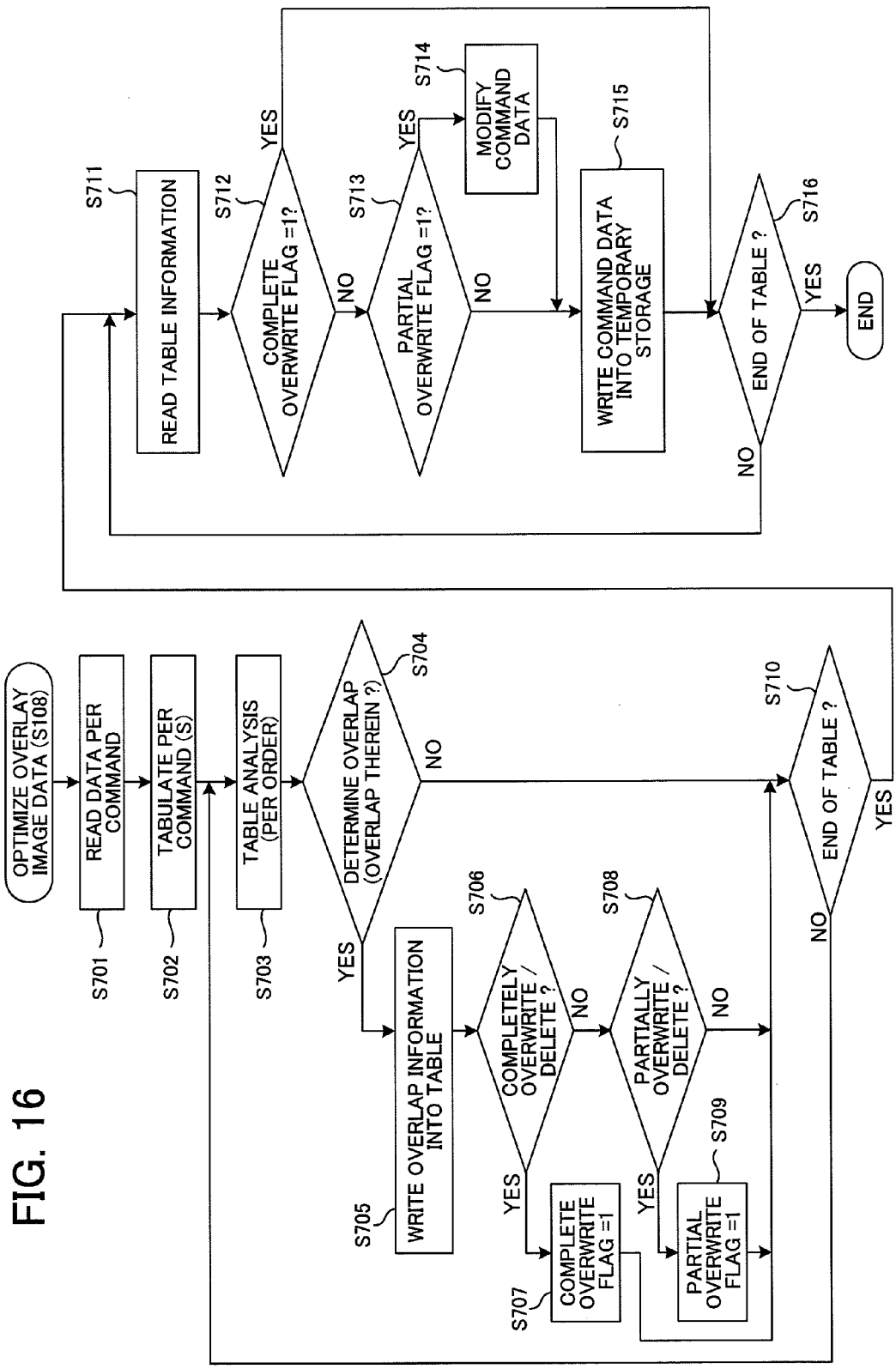
FIG. 16 is a flowchart illustrating a processing sequence for executing the fourth specific example of the optimization.

A specific process for executing the optimization processing will be described with referring to a flowchart of FIG. 16.

First, the optimization processor 361 reads the overlay image data with respect to each command (step S701) and tabulates with respect to each command or command group (step S702). The table is generated by entered in chronological order of command based on command type, offset value at starting, data size, drawing position, drawing area information, overlap information (Default value=0), and completion flag information (Default value=0). Note that the attribute information and the coordinate information at the time of starting reading the drawing commands are also registered in addition to the above entered information, if a PDL designates the coordinate and the attribute differently from the drawing commands. However, a PDL designating of the position and the attribute in the data part of the drawing commands does not need the registration Further, the optimization processor 361 analyzes the table (step S703), and judges whether there is an overlap area between entered contents based on the analyzed result (step S704). Furthermore, the optimization processor 361 writes the overlap information on the table when the overlap exists (step S705). Namely, the optimization processor 361 writes the overlap information for a combination of commands overlapping each other on the table.

Further, the optimization processor 361 judges whether the overlap completely overwrites and deletes on the other area of the entered content (step S706). If complete overwriting and deletion are performed, a completion overwritten flag of the overwritten and deletion entry is set to 1 (step S707). Similarly, the optimization processor 361 judges for a partial overwriting and deletion (step S708), and sets the partial overwritten flag of the overwritten and deletion entry to "1" when the partial overwritten and deleted part exists (step S709). The optimization processor 361 repeats the series of the processing until the table terminates (step S710).

Next, the optimization processor 361 reads entries from the top of the table (step S711) to judge the completion overwrite flag and the partial overwrite flag in each entry (steps S712 and S713). When the entry is the completion overwrite flag=1, the optimization processor 361 skips the processing because the entry can be deleted by the overwriting/deletion, based on the judgment ("Yes" in step S712). When the partial overwrite flag=1, the optimization processor 361 analyzes again the entry overwriting and the entry overwritten/deleted, and confirms the deletable data to modify the command to a command having contents without the overwritten/deleted (step S714), and subsequently writes the modified command on the temporary storage 366 (step S715). Note that when both of the completion overwrite flag and the partial overwrite flag=0, these command data is directly written on the temporary storage 366 (step S715). The optimization processor 361 repeats the series of the processing until the table terminates (step S716).

Second Exemplary Embodiment

Next, an image processing apparatus according to a second exemplary embodiment of the present invention will be described.

The optimization processor 361 according to the second exemplary embodiment optimizes the overlay image data still not modified at idle state where the processing load of the whole image processing apparatus is equal to or lower than the predetermined load.

FIG. 17 shows an exemplary overlay control table used in an image processing apparatus according to the second exemplary embodiment. The overlay control table shown in FIG. 17 has an optimization flag indicating whether or not the subject image data has been optimized in addition to the overlay ID, the bit-mapped image data storage location address, and the overlay image data storage location address. Note that the optimization flag=1 means that the optimization has been completed, and the optimization flag=0 means that the optimization has still not been completed.

Figure 18:
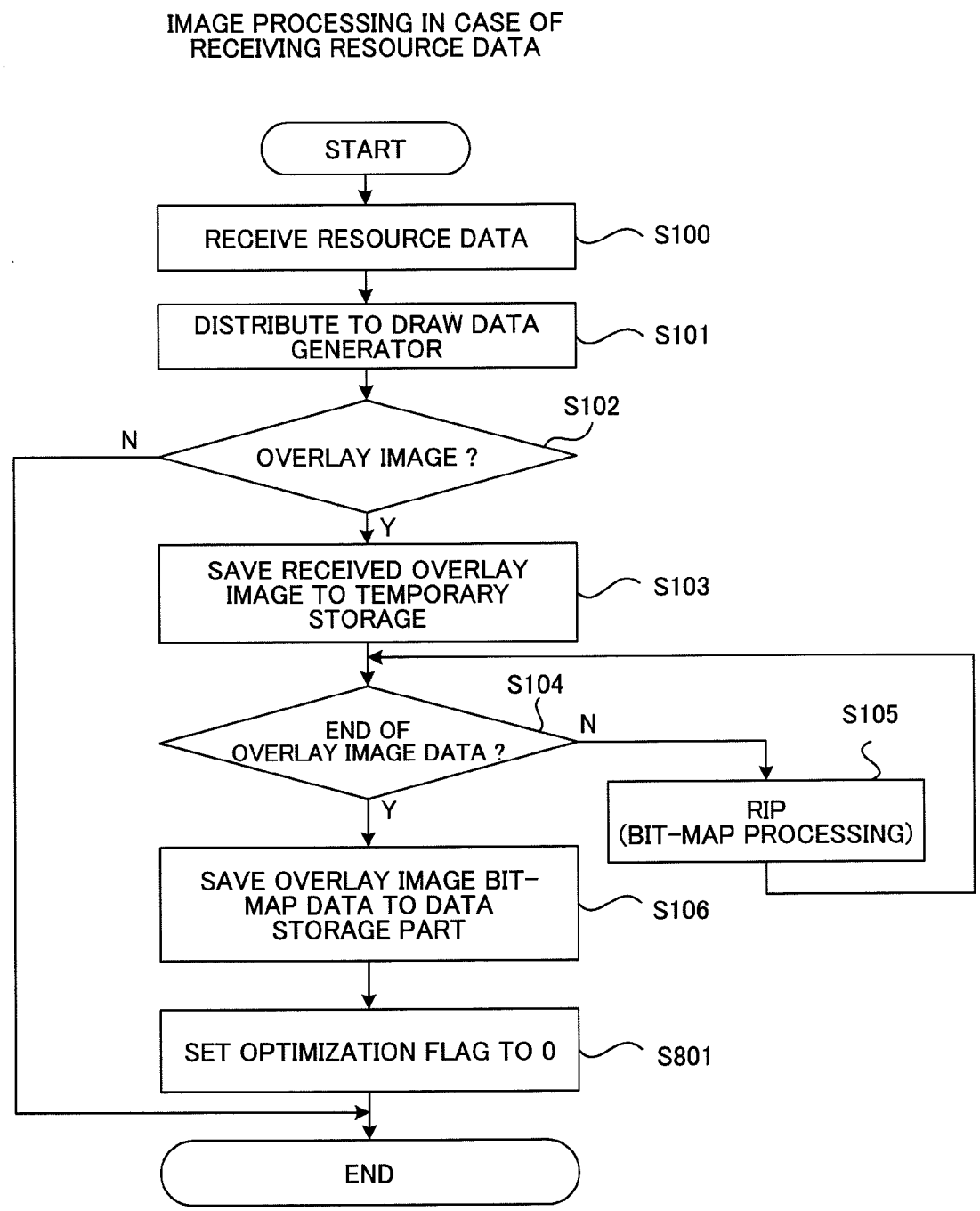
FIG. 18 is a flowchart showing an image processing executed in case that resource data is received in the image processing apparatus 12 according to the second exemplary embodiment of the present invention.

Next, an image processing in the case where the resource data is received in the image processing apparatus according to the second exemplary embodiment will be described with referring to a flowchart of FIG. 18. Note that the explanation of steps S100 to S106 of the flowchart in FIG. 18 is omitted because of same processing as the processing of the first exemplary embodiment shown in FIG. 6.

In the second exemplary embodiment, though the optimization is not executed, but the processing of setting the optimization flag to 0 is executed at the time of receiving the resource data (step S801).

Figure 19:
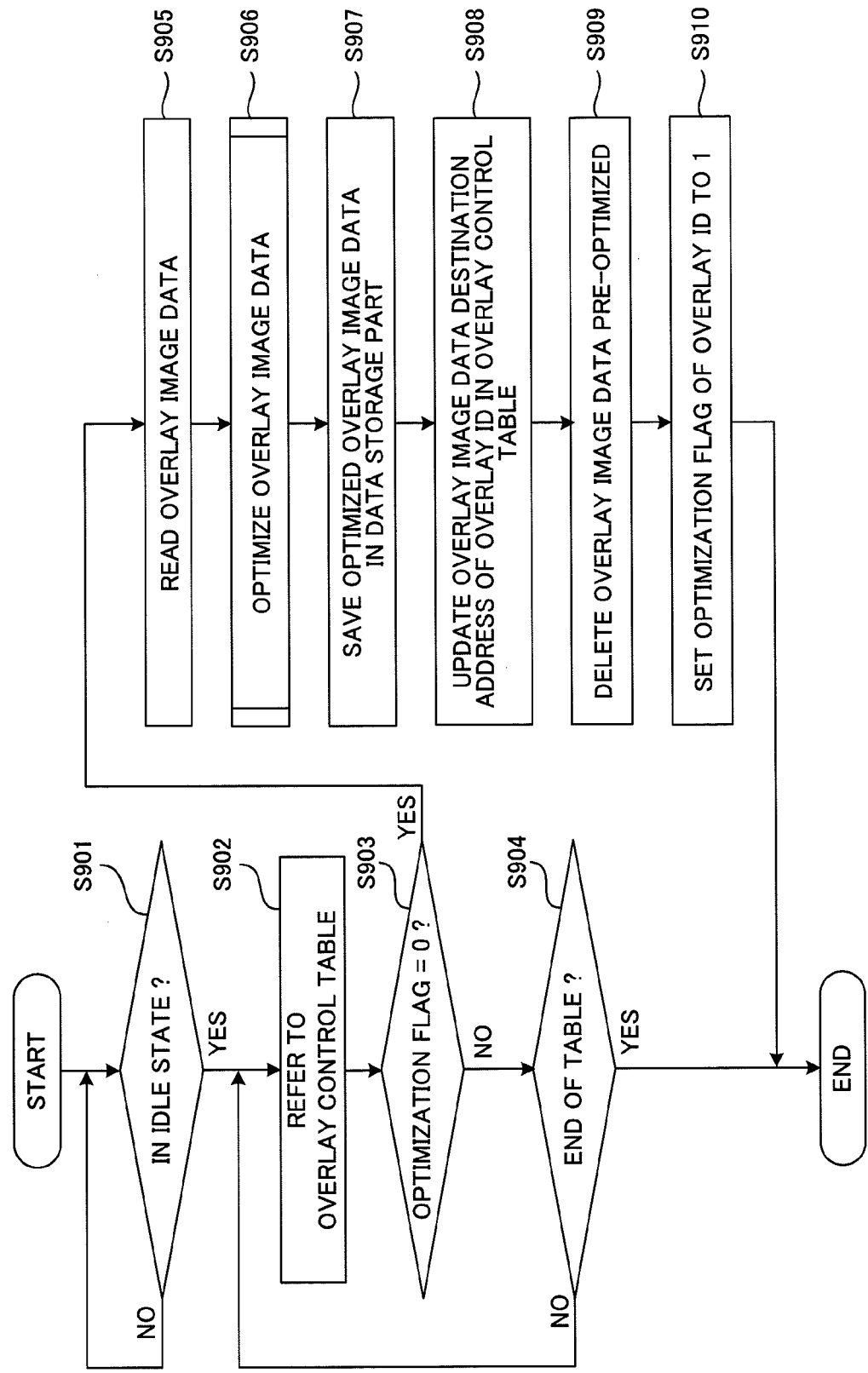
FIG. 19 is a flowchart illustrating an operation with an optimization processor 361 in the image processing apparatus 12 according to the second exemplary embodiment of the present invention.

Next, operation with the optimization processor 361 in the image processing apparatus according to the second exemplary embodiment will be described with referring to a flowchart of FIG. 19.

The draw controller 362 of the second exemplary embodiment monitors whether or not the image processing apparatus 10 is in the idle state (step S901). Accordingly, the idle state triggers the overlay optimization sequence to be started.

When the image processing apparatus 10 is in the idle state, the draw controller 362 refers to the overlay control table (step S901) to search the entry of the optimization flag=0 (step S903). If the entry of the optimization flag=0 exists, the draw controller 362 reads the overlay image data of the subject entry (step S905) to optimize (step S906). The specific examples of the optimization are performed in the same way as the first exemplary embodiment.

Further, the draw controller 362 saves the optimized overlay image data in an overlay image data storage area of the data storage part 38 (step S907), and subsequently updates the overlay image data storage location address of the entry in the overlay control table to the optimized overlay image data storage location address (step S908). Further, the draw controller 362 deletes the overlay image data before the optimization is executed from the data storage part 38 (step S909).

Finally, the draw controller 362 terminates the optimization by set the optimization flag of the entry to 1 (step S910).

In the second exemplary embodiment of the image processing apparatus according to the present invention, since a sequence of the optimization terminates whenever one overlay image has been optimized, if the idle state in the image processing apparatus 12 is kept on thereafter, the optimization for next overlay image is started again from scratch. However, the optimization are not be limited to the above, and may be continuously performed for plural overlay images in only one optimization flow. In that case, the second exemplary embodiment of the image processing apparatus 12 allows the draw controller 362 to recognize that the idle state has been exited by an interrupt control or the like, and to stop the optimization during the interrupt.

Third Exemplary Embodiment

Next, an image processing apparatus according to the third exemplary embodiment of the present invention will be described.

The optimization processor 361 executes the optimization of an overlay image data in the state where number of judgment that the bit-mapped image data is not usable, by the bit-mapped data usability judgment part 363, is equal to or more than the predetermined number.

An exemplary overlay control table used in an image processing apparatus according to the third exemplary embodiment of the image processing apparatus is shown in FIG. 20. The overlay control table shown in FIG. 20 has information for number of times that he overlay image data is re-rendered (Re-rendering) in addition to the overlay ID, the bit-mapped image data storage location address, the overlay image data storage location address, and the optimization flag.

Next, a mapping processing of the overlay image in the image processing apparatus of the third exemplary embodiment according to the present invention will be described with referring to a flowchart of FIG. 21.

When the print data has the mapping instruction of the overlay image, the bit-mapped data usability judgment part 363 judges whether or not the stored bit-mapped data for the overlay image is usable without affecting the output result (step S1001). In step S1001, when judged that the bit-mapped data is usable, the draw controller 362 reads the bit-mapped data in accordance with the overlay ID in the overlay control table from the data storage part 38 (step S1002), and pastes the read bit-mapped data on the designated position of the page image without rendering (step S1003).

In step S1001, when judged that the bit-mapped data is not usable, the draw controller 362 confirms whether the optimization flag is "0" in the entry with referring to the overlay control table (step S1005). Further, the draw controller 362 adds one time to number of times of re-rendering in the entry when the optimization flag=0 (step S1006), and subsequently confirms whether number of times of re-rendering is equal to or more than threshold value (step S1007). When equal to or more than threshold value, the draw controller 362 reads the overlay image data (step S1011) to allow the optimization processor 361 to execute the optimization (step S1012). The specific methods of the optimization are the same as the specific examples described above in the first exemplary embodiment.

After the optimization, the draw controller 362 saves the optimized overlay image data in an overlay image data storage area of the data storage part 38 (step S1013), and sequentially updates the overlay image data storage location address of the entry in the overlay control table to the optimized overlay image data storage location address (step S1014), and further, deletes the overlay image data before the optimization (step S1015), and sets the optimization flag of the entry in the overlay control table to 1 (step S1016).

Furthermore, the draw controller 362 reads the overlay image data based on the overlay image data storage location address (step S1008), and sequentially confirms that the overlay image data is not terminated (step S1009) to re-render the read overlay image data with the RIP part 364 (step S1010).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a receiving unit that receives an additional image data to be overlaid on an output image;
a modification unit that modifies the additional image data received by the receiving unit so as to shorten the processing time of converting the additional image into a binary image compared with before it modified;
a storage unit that stores the additional image data modified by the modification unit;
a converting unit that converts the modified additional image data stored in the storage unit into a binary additional image data when instruction of overlaying the additional image on the output image has been done;
a drawing unit that draws the binarized additional image data converted by the converting unit on the output image,
wherein the drawing unit registers an identifier of the additional image data, a storage location of the additional image data modified by the modification unit, and a storage location of the binarized additional image data in an overlay control table.

2. An image processing apparatus comprising:
a receiving unit that receives an additional image data to be overlaid on an output image;
a modification unit that modifies the additional image data received by the receiving unit so as to shorten the processing time of converting the additional image into a binary image compared with before it modified;
a converting unit that converts the additional image data received by the receiving unit into a binary image data;
a storage unit that stores the additional image data modified by the modification unit and the binarized additional image data converted by the converting unit;

a judgment unit that judges whether or not the binarized additional image data stored in the storage unit is usable when instruction of overlaying the additional image on the output image has been done; and a drawing unit that draws the binarized additional image data converted by the converting unit on the output image;

wherein the converting unit converts the modified additional image data stored in the storage unit into the binary image data when the judgment unit judges that the binarized additional image data is not usable.

3. The image processing apparatus according to claim 2, wherein the drawing unit draws the binarized additional image data stored in the storage unit when the judgment unit judges that the binarized additional image data is usable.

4. The image processing apparatus according to claim 2, wherein the modification unit modifies the additional image data when a number of times that the judgment unit judges that the binarized additional image data is not usable, is equal to or more than a predetermined number of times.

5. The image processing apparatus according to claim 1, wherein the modification unit modifies the additional image data having not been modified at the time where a processing load of the whole apparatus is equal to or lower than a predetermined load.

6. The image processing apparatus according to claim 2, wherein the modification unit modifies the additional image data having not been modified at the time where a processing load of the whole apparatus is equal to or lower than a predetermined load.

7. An image forming apparatus comprising:

a receiving unit that receives an additional image data to be overlaid on an output image;

a modification unit that modifies the additional image data received by the receiving unit so as to shorten the processing time of converting the additional image into a binary image compared with before it modified;

a storage unit that stores the additional image data modified by the modification unit;

a converting unit that converts the modified additional image data stored in the storage unit into a binary additional image data when instruction of overlaying the additional image on the output image has been done;

a drawing unit that draws the binarized additional image data converted by the converting unit on the output image; and an image output unit that outputs an image based on the output image that the additional image is drawn onto by the drawing unit, wherein the drawing unit registers an identifier of the additional image data, a storage location of the additional image data modified by the modification unit, and a storage location of the binarized additional image data in an overlay control table.

8. An image forming apparatus comprising:

a receiving unit that receives an additional image data to be overlaid on an output image;

a modification unit that modifies the additional image data received by the receiving unit so as to shorten the processing time of converting the additional image into a binary image compared with before it modified;

a converting unit that converts the additional image data received by the receiving unit into a binary image data;

a storage unit that stores the additional image data modified by the modification unit and the binarized additional image data converted by the converting unit;

a judgment unit that judges whether or not the binarized additional image data stored in the storage unit is usable when instruction of overlaying the additional image on the output image has been done;

a drawing unit that draws the binarized additional image data converted by the converting unit on the output image; and an image output unit that outputs an image based on the output image that the additional image is drawn onto by the drawing unit;

wherein the converting unit converts the modified additional image data stored in the storage unit into the binary image data when the judgment unit judges that the binarized additional image data is not usable.

9. An image processing method comprising: receiving an additional image data to be overlaid on an output image;

modifying the additional image data received so as to shorten the processing time of converting the additional image into a binary image compared with before it modified;

storing the additional image data modified;

converting the additional image data modified and stored into a binary additional image data when instruction of overlaying the additional image on the output image has been done;

drawing the binarized additional image data on the output image; and registering an identifier of the additional image data, a storage location of the additional image data modified, and a storage location of the binarized additional image data in an overlay control table.

10. An image processing method comprising: receiving an additional image data to be overlaid on an output image;

modifying the additional image data received so as to shorten the processing time of converting the additional image into a binary image compared with before it modified;

converting the additional image data received into a binary image data;

storing the additional image data modified and the binarized additional image data;

judging whether or not the binarized additional image data stored is usable when instruction of overlaying the additional image on the output image has been done;

converting the additional image data modified and stored into the binary image data when the judgment is that the binarized additional image data is not usable; and drawing the binarized additional image data on the output image.

11. A non-transitory computer readable medium storing a program causing a computer to execute a process for image processing, the process comprising:

receiving an additional image data to be overlaid on an output image;

modifying the additional image data received so as to shorten the processing time of converting the additional image into a binary image compared with before it modified;

storing the additional image data modified;

converting the additional image data modified and stored into a binary additional image data when instruction of overlaying the additional image on the output image has been done;

drawing the binarized additional image data on the output image; and registering an identifier of the additional image data, a storage location of the additional image data modified, and a storage location of the binarized additional image data in an overlay control table.

12. A non-transitory computer readable medium storing a program causing a computer to execute a process for image processing, the process comprising:

receiving an additional image data to be overlaid on an output image;

modifying the additional image data received so as to shorten the processing time of converting the additional image into a binary image compared with before it modified;

converting the additional image data received into a binary image data;

storing the additional image data modified and the binarized additional image data;

judging whether or not the binarized additional image data stored is usable when instruction of overlaying the additional image on the output image has been done;

converting the additional image data modified and stored into the binary image data when the judgment is that the binarized additional image data is not usable; and drawing the binarized additional image data on the output image.

13. The image processing according to claim 1, wherein the modification unit modifies the additional image data in a state where a number of judgments that the binarized additional image data is not usable is equal to or more than a predetermined number.

14. The image processing according to claim 1, wherein the overlay control table also includes at least one of an optimization flag and a number of rerendering.

* * * * *